C. C. POWERS.
VEHICLE TIRE.
APPLICATION FILED NOV. 17, 1915.

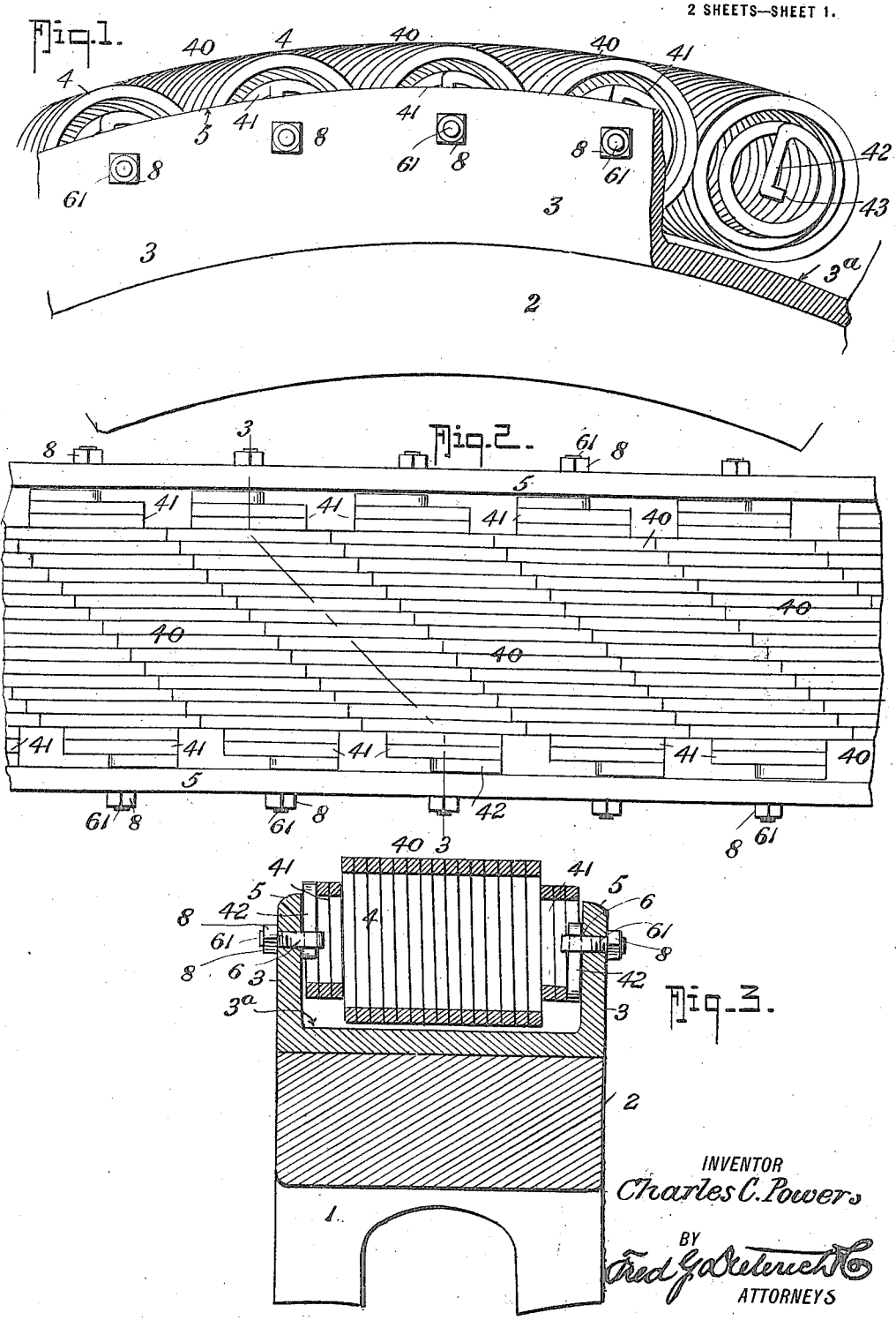

1,180,671.

Patented Apr. 25, 1916.
2 SHEETS—SHEET 2.

INVENTOR
Charles. C. Powers

BY
Fred. G. Dieterich & Co.
ATTORNEYS

UNITED STATES PATENT OFFICE.

CHARLES C. POWERS, OF WILLIAMS, ARIZONA.

VEHICLE-TIRE.

1,180,671.

Specification of Letters Patent. Patented Apr. 25, 1916.

Application filed November 17, 1915. Serial No. 61,959.

*To all whom it may concern:*

Be it known that I, CHARLES C. POWERS, residing at Williams, in the county of Coconino and State of Arizona, have invented certain new and useful Improvements in Vehicle-Tires, of which the following is a specification.

My invention, which particularly relates to resilient metal tires more especially adapted for motor and other heavy vehicles, primarily has for its object to provide an improved tire of the general character stated that can be manufactured at a comparatively low cost, that may be easily assembled and readily repaired, and by the employment of which the troubles incident in the use of pneumatic tires are avoided.

My invention, in its generic nature, embodies an improved construction and arrangement of spiral spring tread units adapted for being coöperatively mounted in the usual channel iron rim of a wheel, and means for so securing each unit to the rim that in case of breakage any one of the tread units may be readily removed and a new one substituted therefor without disturbing the remaining units.

Figure 4:
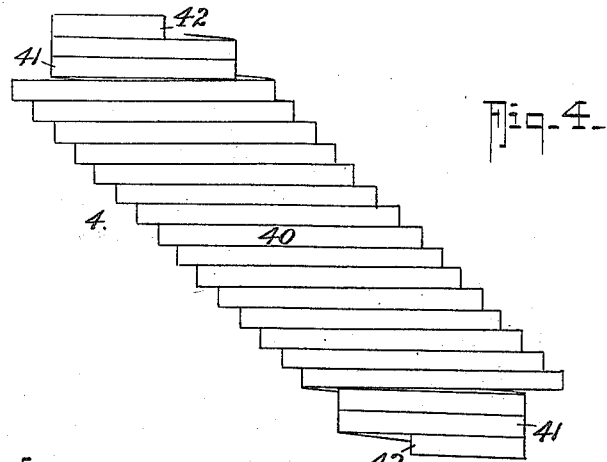
Figure 6:
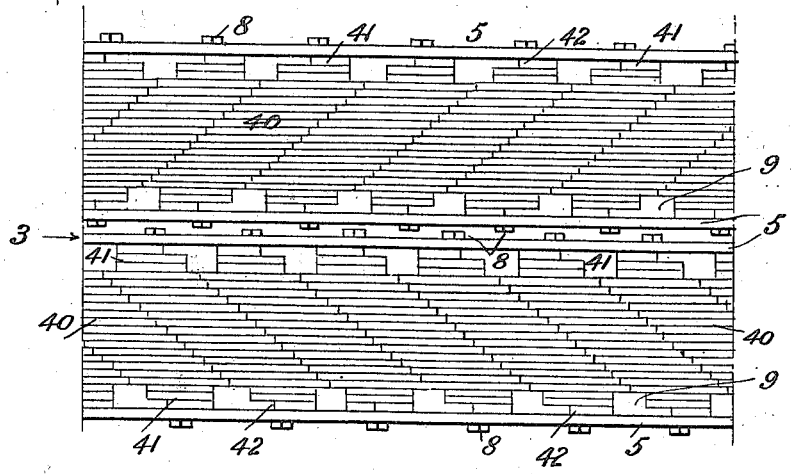
Figure 5:
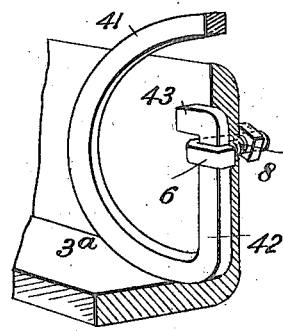

In its more subordinate features, my improved tire consists in the peculiar construction and novel combination of parts hereinafter fully explained, specifically pointed out in the appended claims and illustrated in the accompanying drawings, in which:

Figure 1 is a side elevation, parts being broken away, of a portion of a vehicle wheel with my improved tire members operatively mounted thereon. Fig. 2 is a plan view of so much of a wheel with my tire applied, as is shown in Fig. 1. Fig. 3 is a transverse section thereof taken substantially on the line 3—3 of Fig. 2. Fig. 4 is a detail plan view of one of the spiral spring tread units constructed in accordance with my invention. Fig. 5 is a detail sectional perspective that illustrates one way of connecting the ends of the spiral spring tread units to the rim. Fig. 6 is a diagrammatic view of a slightly modified construction of my invention.

In the drawings, which illustrate so much of a vehicle wheel structure as is necessary to disclose a practical application of my invention, 1 designates the wheel spokes, 2, the wheel felly and 3 the rim or channel iron, it being understood that when my invention is applied to very heavy wheels the felly of the wheel is of metal and formed with the channel iron or rim portion.

My improved wheel tire is composed of a series of spiral spring tread units and when applied to the wheel are disposed diagonally across the peripheral face of the wheel, as clearly shown in Fig. 2.

Each tread unit 4 is in the nature of a stout coil spring, preferably of the cross-sectional shape shown in the drawings, and each of the said tread units includes a number of coils at each end wound in parallelism and of one diameter, that merge with a central or tread portion 40 also formed of coils and of a larger diameter, and the said coils of the portion 40 progressively overlap each other, as is best shown in Fig. 2, by reference to which it will be seen that the coils of one section or tread portion 40 are held in edgewise engagement with the coils in the next tread portion 40, such correlation of the tread portion extending entirely around the channel of the rim 3.

The advance of each coil in the tread portion 40 beyond the preceding coil depends on the character of the vehicle for which the wheel may be provided, the heavier the vehicle, the more closely are the coils assembled.

The coils in the lapped portion of each unit are of greater diameter than the end coils 41—41, the diameter being such that the coils 40 seat against the abutment of the rim and with their outer or tread faces projected sufficiently beyond the side flanges 5—5 of the rim to allow for the required resiliency of the tire without danger of compressing the spring units entirely within the rim groove 3ª and thereby avoid the danger of the side flanges 5—5 striking the ground in going over rough places.

The opposite ends of each spring unit, by reason of the coils that constitute the same being of a less diameter than the central or tread portion proper, provides for utilizing a simple and effective means for securing the units on the rim and in such manner that in case of breakage of any of the units, the broken unit may be quickly removed and also for relieving the connection of the ends of the spring units 4 with the rim groove from undue tortional or twist strain that would occur if the coils of each unit were sustained in a continuous diagonal direction from one end to the other. Again, by arranging the opposite ends of each unit in the manner stated and shown, parallel hub-like portions that extend transversely of the wheel rim, are provided, and by reason of the coils that constitute the said hub-like portion being of a smaller diameter than the coils 40 that form the diagonal portion of the unit, the said hub-like portions under ordinary uses of the wheel are held from contact with the ground since the running shocks, etc., are taken up by the intermediate or diagonal portion of the unit.

By securing the units so as to hold them to their operative condition and also for readily removing broken ones and substituting new ones therefor, I prefer to use the means best shown in Fig. 5, by reference to which it will be noticed that at each end of the hub-like portions 41 of the coils the wire strand is bent inwardly with respect to the coil as at 42 and terminates in a lateral hook-like member 43, the purpose of which will presently appear, and which member 42 is adapted for being engaged by an open ended clip 6 which includes a threaded stem 61 for passing through the rim. By referring to Fig. 3, it will be seen that the clips 6 are tightly drawn up by the nuts 8 that engage the threaded stem 61 and the hook members 43 of the spring ends 42 firmly hold the units from moving out of position in the rim groove or channel, it being apparent that when it is desired to remove any one of the units it is only necessary to remove the nuts 8 that secure the clip members and to push the said clip members back into the open ends of the coils.

The wire of which the coils are formed may be of different shapes but the flat cross sectional shape shown is preferable since the tread face of the tire thereby conforms nearly to a true circle and further a more solid form of resilient tire is produced than would be possible were the spring wire round or of other cross sectional shape.

The spring units may be made of any suitable resilient metal and each of the said units is formed of a continuous coil body having a central portion in which the coils are lapped and projected in diagonal relation and with hub-like portions that extend transversely of the rim portion and in parallel relation.

The advantages of my construction of tire will be readily apparent from the foregoing taken in connection with the accompanying drawings, it being also understood that the size of the spring units, the temper and the strength of the spring coils as well as the size of the wheels may vary as may be found necessary.

When very large wheels for heavy trucks and the like are to be provided with my construction of tire the spring treads may consist of a plurality of annular rows, for example, as illustrated in Fig. 6 which shows a felly provided with two annular channelways 9—9 and in each of which is placed a continuous row of tread units and when thus arranged the two sets of tread units are alternately positioned to provide for utilizing the clip connections herein before referred to that secure the units in place and also to produce a practically continuous tread surface since in the modified construction the unit in one channel or groove reaches its tread position before the unit back of it in the other channel rises entirely from its tread position thereby getting a better grip on the road.

What I claim is:

1. In a wheel, a rim having parallel flanges spaced apart, coil spring units held in parallelism between the said flanges and including portions that extend diagonally across the rim, the coils of the diagonally extending portions of the said units lapping each other, the lapped spring coils of one unit edgewise engaging lapped coils of the next unit and means for detachably securing each spring unit at its opposite ends to the rim flanges.

2. In a vehicle wheel, a rim having an annular channel, a resilient spring tread mounted in the said channel and consisting of a series of coil spring units that extend in close relation entirely around the rim, each of the said units including coils at the opposite ends that extend transversely to the rim, and intervening coils that progressively overlap and formed as a diagonal section between the end portions, and means for detachably and individually securing the opposite ends of each unit to the rim flanges.

3. In a wheel, a rim having parallel flanges spaced apart, coil spring units held in parallelism between the said flanges, each of said units including a portion that extends diagonally across the rim, the diagonal portions of the several spring units interengaging each other, and means for securing each end of each coil spring unit to the flanges.

4. In a wheel, a rim having an annular channel, spring tread units located in the channel, said units each comprising end coil sections that extend transversely of the rim and a coil section that joins at the ends with the end coil sections, and is extended diagonally across the rim, and means for individually securing each unit to the rim.

5. In a wheel, a rim having an annular channel, spring tread units located in said channel, said units each comprising end-coil sections that extend transversely of the rim, an intermediate coil section that joins at its ends with the end-coil sections and is extended diagonally across the rim, means for individually securing each unit to the rim, the said intermediate coil section being of greater diameter than the end sections.

6. In a wheel having two parallel and adjacent annular channels, coiled spring tread units held in parallelism with each channel and projected diagonally across the wheel rim, the series of units in one channel being projected diagonally in a direction opposite the diagonal set of the series of units in the other channel.

7. In a wheel, a rim having parallel flanges spaced apart, coil units that extend entirely around the rim, each of said units consisting of end-coil sections and an intermediate tread-coil section, said tread-coil sections extending diagonally across the rim between the end-coil sections, the coils of the intermediate coil sections progressively overlapping one another, the coils of the intermediate section of one unit lapping over the coils of the intermediate sections of the adjacent units.

CHARLES C. POWERS.

Copies of this patent may be obtained for five cents each, by addressing the "Commissioner of Patents, Washington, D. C."